April 30, 1946.  E. A. WENK  2,399,275
FITTING FOR FLARED TUBING
Filed May 2, 1944
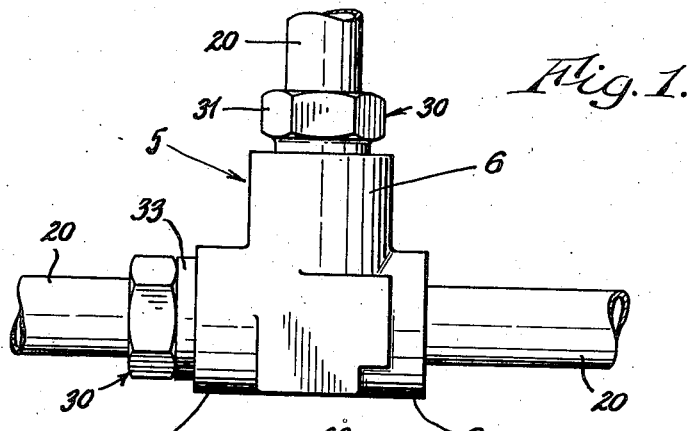
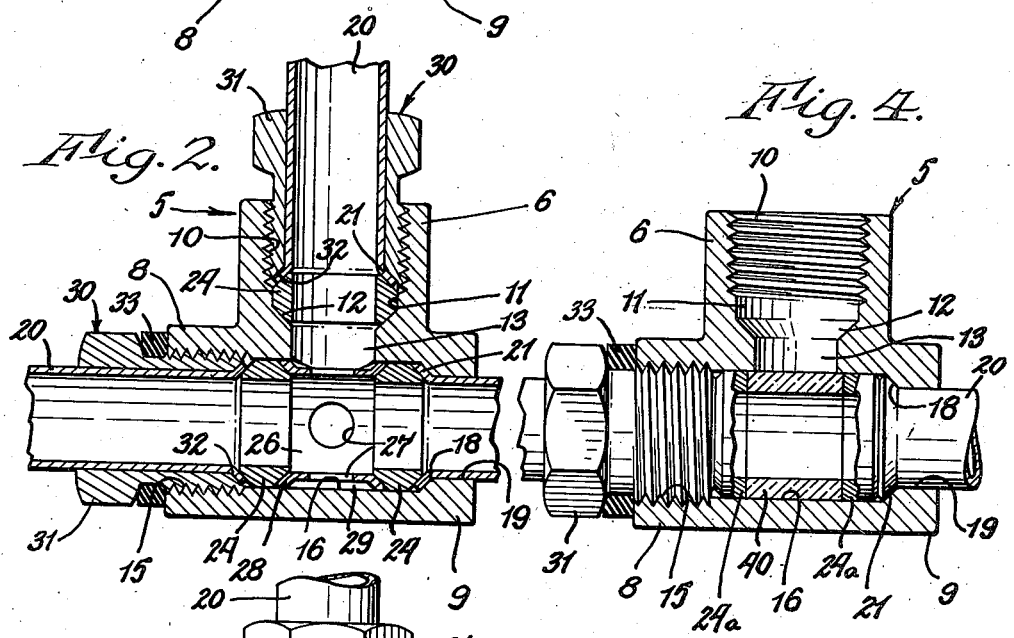
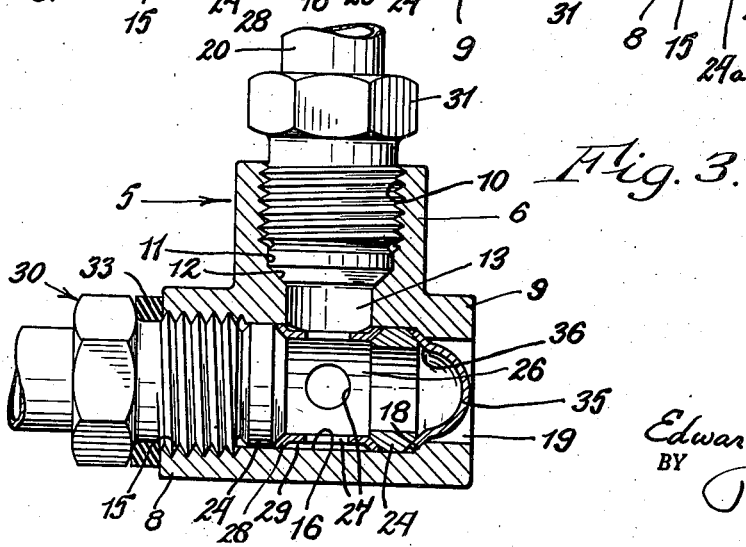
INVENTOR.
Edward A. Wenk
BY
Popop and Popop
Attorneys Patented Apr. 30, 1946

2,399,275

UNITED STATES PATENT OFFICE 2,399,275

FITTING FOR FLARED TUBING

Edward A. Wenk, New York, N. Y., assignor to The Keystone Manufacturing Co., Buffalo, N. Y., a corporation of New York Application May 2, 1944, Serial No. 533,705

6 Claims. (Cl. 285—86)

This invention relates to a fitting for flared tubing and more particularly to such a fitting which is adapted to be used either as an L or a T or can be used as a fitting providing a sight glass through which the condition of the liquid flowing through the line can be visually observed.

With flared tube fittings, as with other pipe fittings, it is now common practice to plug up one leg of a T in order to provide an L. This, however, leaves a useless leg on the fitting, when used as an L, which often interferes with its installation.

It is accordingly one of the objects of the invention to provide a T which can be adapted into an L and in which the leg rendered useless is relatively short so as not to interfere with the installation of the adapted L in cramped quarters.

A further object of the invention is to provide such a fitting which requires only one added part to adapt it from a T to an L, it being thereby necessary for the repair man to carry around a few of these parts in order to adapt the fittings for use either as an L or a T.

Another object is to provide such a fitting which, when connected with the flared ends of the tubing either as an L or a T will provide a reliable joint which is sealed against the high pressures to which flared tubing is usually subjected.

Another aim is to provide such a fitting in which a number of the parts are adapted for use in other fittings and combinations, such as in the heat exchanger forming the subject matter of my copending patent application Serial No. 533,706 filed May 2, 1944.

Another purpose is to provide such a fitting which, by the use of a simple tubular piece of glass will provide a sight glass fitting which can be inserted in the line as may be desired.

Another object is to provide such a convertible fitting which is composed of simple and inexpensive parts and which can be adapted to any form with little trouble or skill.

In the accompanying drawing:

Fig. 1 is a side elevation of the fitting embodying the invention showing the same installed as a T.

Fig. 2 is a vertical central section through the fitting coupled as in Fig. 1.

Fig. 3 is a view similar to Fig. 2 showing the fitting installed as an L.

Fig. 4 is a view similar to Figs. 2 and 3 and showing the fitting installed as a sight glass fitting.

The fitting embodying the present invention is shown as comprising a body 5 having two long branches or legs 6 and 8 arranged at right angles to each other and a short branch or leg 9 which is axially in line with one of the long legs or branches such as with the leg or branch 8 as shown.

The leg or branch 6 is provided with a bore, the enlarged outer part 10 of which is internally threaded and leads to a reduced cylindrical portion 11 which terminates in a conical seat 12, the inner rim of this seat being defined by a reduced cylindrical bore 13.

The legs or branches 8 and 9 are provided with a common axial bore which is intersected by the inner reduced extremity 13 of the bore through the leg 6. That end of the bore extending through the leg 8 is internally threaded, as indicated at 15 and leads to a cylindrical bore 16 of reduced diameter which extends across the central part of the body 5 and is intersected by the bore of the leg 6. The end of the reduced cylindrical bore 16 opposite from the threads 15 terminates in a conical seat 18, the inner rim or margin of which is defined by a further reduced cylindrical bore 19 which extends through the short leg 9 of the body. This last reduced bore 19 is proportioned to fit the cylindrical part of one of the tubes 20 to which the fitting is to be connected, each of these tubes 20 having its end flared, as indicated at 21, for this purpose.

The connection of the flared ends of the several tubes 20 involves the use of a plurality of rings or washers 24, these being identical in form. Each of these rings or washers has an axial bore which corresponds in size to the internal diameter of the tubes 20 and the cylindrical periphery of each of these rings or washers 24 fits into the corresponding cylindrical bore 11 or 16 of the body 5. The opposite ends of each of these rings or washers 24 are beveled at the same angle to converge outwardly and toward each other, these beveled ends being adapted to fit against the flared ends 21 of the tubes or against the conical seat 12 of the leg 6.

When the fitting is used as a T, the flared end 21 of one of the tubes 20 is fitted in the bore 19 of the body with its flare 21 against the conical seat 18 and one of these rings or washers 24 is fitted in the bore 16 against this flare 21 as shown in Fig. 2. Against the other beveled end of this ring or washer 24 is fitted a tubular annulus 26. This tubular annulus comprises a cylindrical tubular body having outwardly flaring annular flanges 28 at its opposite ends, these flanges being arranged at an angle to fit the beveled or conical faces of the rings or washers 24. The tubular annulus 26 is provided with a plurality of holes 27 the total face area of which is at least equal to the inside diameter of the tubes 20 and a ring or washer 24 is fitted against each end of the same. It will be noted that the end flanges 28 provide an annular chamber 29 between the tubular annulus 26 and the bore 16 of the body, this annular chamber 29 rendering all of the holes 27 useful in conducting fluid.

In each of the legs 6 and 8 is screwed an internal flare nut 30 of standard form. The bore through each of these internal flare nuts 30 is equal to the outside diameter of the tubes 20 and each is externally threaded to screw into the threads 10 or 15 of the legs 6 and 8. At its outer end each flare nut 30 is provided with a hexagonal or other out-of-round head 31 and at its inner end each internal flare nut is provided with a concave conical or bevel face 32 which is adapted to fit against the convex side of any of the flares 21 provided on the tubes 20. A lead washer 33 is interposed between the head 31 of the internal flare nut 30 and the end of the leg 8, this lead washer insuring against leakage past this flare nut and the parts held thereby.

In assembling the fitting for use as a T, as shown in Figs. 1 and 2, the ends of the three tubes 20 are flared to provide the flares 21 in the usual manner either before or after insertion into the corresponding internal flare nut 30 or into the body of the fitting. The flare 21 of one of the tubes 20 is then fitted against the beveled or conical seat 18 of the body with the tube projecting out through the bore 19 in this body and a ring or washer 24 is fitted in the bore 16 of the body with one of its beveled or conical end faces against the concave end face of this flare 21 of this tube. The tubular annulus 26 is then fitted in the bore 16 of the body with one of its flaring end flanges 28 fitting against the other beveled end face of this ring or washer 24 and a second ring or washer 24 is fitted against the other end of the tubular annulus 26. The flared end of another tube 20 is then fitted into the leg 8 of the body and its flare 21 fitted against the conical or beveled outer end of this last ring or washer 24 and one of the internal flare nuts 30 is then screwed into the threaded leg 8 and tightened. In order to insure a tight joint in the leg 8, a lead washer 33 is interposed between the end of its flare nut 30 and the end of this leg, this lead washer spreading to provide full contact with both. It will be seen that tightening this flare nut forces the flared ends of the two axially alined tubes and the rings 24 and flanges 28 of the tubular annulus 26 into firm engagement with one another and into engagement with the conical seats 18 and 32 of the body and internal flare nut, respectively, and provides connections between the two axially alined tubes 20 and the body 5 which will not leak under high pressure.

To secure the third tube 20, another ring or washer 24 is fitted into the bore 11 of the body with its conical end seated against the conical or beveled seat 12 at the end of this bore. The flare 21 of the third tube 20 is then fitted against the opposite conical or beveled face of this last ring 24 and another internal flare nut 30 screwed into the threads 10 of the leg 6. When this internal flare nut is tightened down it will be seen that the flare 21 of this third tube 20 is firmly clamped between the opposed conical faces of the internal flare nut and the ring 24 and also that this ring member is firmly seated on the seat 12 of the body. Accordingly a mechanically strong and leak tight joint is provided between this third tube 20 and the leg 6 of the fitting. It will further be seen that the holes 27 of the tubular annulus establish communication between the several legs of the fitting and the several tubes 20 so connected thereto.

When the fitting is to be used as an L, a cup shaped closure member 35 having a flare 36 identical to the flares 21 of the tubes 20 is substituted for that tube 20 which is fitted in the leg 9 of the fitting in providing a T. The flare 36 of this closure member is fitted between the conical seat 18 in the body and the opposing conical seat of the adjacent ring or washer 24 and it will therefore be seen that the closure member plugs or blocks off the leg 9 of the fitting so as to provide an L. A feature of the fitting is that the plugged or blocked leg 9 is short so that when used as an L this leg presents the minimum interference with other structure in securing the fitting in place.

The use of the fitting as a sight glass fitting is illustrated in Fig. 4. This form of the invention is identical with the form of the fitting as a T, as shown in Figs. 1 and 2 except that a short cylindrical section 40 of glass is substituted for the tubular annulus 26 and a tube is not connected to the leg 6 of the fitting so that the flow of liquid through the axially alined tubes 20 and the fitting can be visually observed through the bore of the leg 6 of the fitting. The ends of the glass cylinder 40 are preferably ground square and hence the corresponding rings or washers 24a are also square. These washers 24a can also be made of a soft metal such as lead to provide a reliable seal with the ends of the glass tube or cylinder 40.

From the foregoing it will be seen that the present invention provides a low cost flared tube fitting which can readily be adapted for use as an L, T or sight glass fitting and which will establish reliable and strong joints with the tubes with which they are connected. Further, when used as an L, the blocked off leg of the fitting is relatively short so as to present a minimum of interference with the installation of the fitting.

I claim as my invention:

1. A flared tube fitting, comprising a body having three legs two of which are in axial alinement and provided with an axial bore extending therethrough and the third of which is provided with a bore communicating with said axial bore, one end of said axial bore having a reduced end and being formed to provide a conical seat opposing the enlarged end of said axial bore, the reduced end of said axial bore being adapted to receive a flared tube with its flare seated against said seat and the enlarged end of said axial bore being adapted to receive the flared end of a second tube, a member secured in the enlarged end of said bore and adapted to seat against the outer face of the flare of said second tube, and a tubular member interposed between the opposing faces of the flares of said tubes and providing a tight seal between said tubes and body, said tubular member being provided with an opening through its side establishing communication between the interiors of said tubes.

2. A flared tube fitting, comprising a body having three legs two of which are in axial alinement and provided with an axial bore extending therethrough and the third of which is provided with a bore communicating with said axial bore, one end of said axial bore being threaded and the other end of said axial bore being reduced and being formed to provide a conical seat opposing the threaded end of said bore, the reduced end of said axial bore being adapted to receive a flared tube with its flare seated against said seat and the threaded end of said axial bore being adapted to receive the flared end of a second tube, an internal flare nut screwed in said threaded end of said axial bore around the tube therein and having its inner end adapted to seat against the flare of said second tube, and a tubular member interposed between the opposing faces of the flares of said tubes and providing a tight seal between said tubes and body, said tubular member being provided with an opening through its side establishing communication between the interiors of said tubes.

3. A flared tube fitting, comprising a body having three legs two of which are in axial alinement and provided with an axial bore extending therethrough and the third of which is provided with a bore communicating with said axial bore, one end of said axial bore being threaded and the other end of said axial bore being reduced and being formed to provide a conical seat opposing the threaded end of said bore, the reduced end of said axial bore being adapted to receive a flared tube with its flare seated against said seat and the threaded end of said axial bore being adapted to receive the flared end of a second tube, an internal flare nut screwed in said threaded end of said axial bore around the tube therein and having its inner end adapted to seat against the flare of said second tube, and a tubular member having laterally outward flared end flanges interposed between the opposing faces of the flares of said tubes and providing a tight seal between said tubes and body and also providing an annular chamber between said axial bore and the central part of said tubular member, said third bore communicating with said annular chamber and said annular chamber communicating with the interior of said tubular member through an annular series of holes provided in the sides of said tubular member, and a pair of ring members in said axial bore, each seating against one end flange of said tubular member and the corresponding opposing face of the flare of the adjacent tube.

4. A flared tube fitting, comprising a body having three legs two of which are in axial alinement and provided with an axial bore extending therethrough and the third of which is provided with a bore communicating with said axial bore, one end of said axial bore having a reduced end and being formed to provide a conical seat opposing the enlarged end of said axial bore, the reduced end of said axial bore being adapted to receive a flared tube with its flare seated against said seat and the enlarged end of said axial bore being adapted to receive the flared end of a second tube, a member secured in the enlarged end of said bore and adapted to seat against the outer face of the flare of said second tube, and a glass tube arranged coaxially in said axial bore and interposed between the flares of said tubes and providing a tight seal between said tubes and body, said glass tube being in line with and visible through said third bore.

5. A flared tube fitting, comprising a body having three legs two of which are in axial alinement and provided with an axial bore extending therethrough and the third of which is provided with a bore communicating with said axial bore, one end of said axial bore being threaded and the other end of said axial bore being reduced and being formed to provide a conical seat opposing the threaded end of said bore, the reduced end of said axial bore being adapted to receive a flared tube with its flare seated against said seat and the threaded end of said axial bore being adapted to receive the flared end of a second tube, an internal flare nut screwed in said threaded end of said axial bore around the tube therein and having its inner end adapted to seat against the flare of said second tube, a glass tube arranged coaxially in said axial bore and interposed between the flares of said tubes in a position in line with and visible through said third bore, and a pair of ring members in said axial bore and each seating against one end of said glass tube and the corresponding opposing face of the flare of the adjacent tube.

6. A flared tube fitting, comprising a body having three legs two of which are in axial alinement and provided with an axial bore extending therethrough and the third of which is provided with a bore communicating with said axial bore, one end of said axial bore being threaded and the other end of said axial bore being reduced and being formed to provide a conical seat opposing the threaded end of said bore, the reduced end of said axial bore being adapted to receive a flared tube with its flare seated against said seat and the threaded end of said axial bore being adapted to receive the flared end of a second tube, an internal flare nut screwed in said threaded end of said axial bore around the tube therein and having its inner end adapted to seat against the flare of said second tube, and a tubular member interposed between the opposing faces of the flares of said tubes and providing a tight seal between said tubes and body, said tubular member being provided with an opening through its side establishing communication between the interiors of said tubes, that leg of said body surrounding the reduced end of said axial bore being shorter than the other two legs of said body.

EDWARD A. WENK.